United States Patent [19]

Rhee et al.

[11] 4,091,419
[45] May 23, 1978

[54] COMBINATION CONTRAST/BRIGHTNESS CONTROL FOR A TELEVISION RECEIVER

[76] Inventors: Dennis W. Rhee, 1108 Cooper Dr., Palatine, Ill. 60067; Gopal K. Srivastava, 523 N. Bristol Ln., Schaumburg, Ill. 60194

[21] Appl. No.: 698,367

[22] Filed: Jun. 22, 1976

[51] Int. Cl.² ............................................. H04N 5/14
[52] U.S. Cl. .................................... 358/168; 358/169
[58] Field of Search .................. 358/168, 169, 184, 39

[56] References Cited

U.S. PATENT DOCUMENTS

| | | | |
|---|---|---|---|
| 3,297,821 | 1/1967 | Loughlin | 358/169 |
| 3,678,191 | 7/1972 | Peters et al. | 358/168 X |
| 3,873,767 | 3/1975 | Okada et al. | 358/169 X |
| 3,914,545 | 10/1975 | Engel | 358/169 |
| 4,005,262 | 1/1977 | Fijisawa et al. | 358/169 X |

*Primary Examiner*—Richard Murray
*Attorney, Agent, or Firm*—R. Lewis Gable

[57] ABSTRACT

A single, combined contrast/brightness control is disclosed herein for a television receiver. A contrast control in the form of a variable potentiometer, is coupled to the output, driver transistor of the video amplifier, which serves to amplify and apply the video signal to the cathode ray tube (CRT) and including AC/DC coupling in the form of a resistor and a capacitor. The DC coupling resistor sets the DC bias level to the output transistor and in particular to its base at a level dependent upon the DC level established across the constrast/brightness control potentiometer. Further, the AC coupling capacitor is selectively charged to further adjust the DC bias of the output transistor to a level with the DC coupling resistor whereby the black level of the output signal applied to the cathode ray tube is maintained relatively constant with regard to a predetermined level. In a preferred embodiment of this invention, the predetermined level is the sync tip and back porch voltages and the charging of the AC coupling capacitor is carried out during the horizontal retrace cycle, at which time a charging circuit is formed through the capacitor whereby it is charged to a potential dependent upon the setting of the contrast control potentiometer, and thus, the bias level to the base of the output transistor is adjusted to set the black level to a predetermined level. In this manner, it is only necessary to use the single contrast/brightness control to set both the contrast and the brightness level of the displayed image upon the CRT.

11 Claims, 3 Drawing Figures

COMBINATION CONTRAST/BRIGHTNESS CONTROL FOR A TELEVISION RECEIVER

BACKGROUND OF THE INVENTION

1. Field of the Invention

This invention relates to video signal processing circuits and, in particular, to such circuits which are used in the luminance signal amplifying channel of a television receiver.

2. Description of the Prior Art

In a typical television receiver, it is normal to employ separate brightness and contrast controls whereby these respective characteristics of the image displayed upon the receiver's cathode ray tube (CRT) may be adjusted. Typically, the contrast control is inserted in the luminance signal amplifying channel or video signal amplifier in a manner to adjust the amplitude of the video signal. In FIG. 3, a signal horizontal scan line of the video signal is shown, illustrating the video information signal as having a peak-to-peak amplitude A occurring during the horizontal trace period, and the sync tip, white level, and back porch portions of the signal. It is understood that varying the contrast control would set or readjust the amplitude A; for example, if it is desired to diminish the contrast of the displayed picture, the amplitude A is decreased. On the other hand, the separate brightness control adjusts the black level of the video signal to determine the point at which cutoff occurs of the electron beam of the CRT. Typically, the brightness control in the form of a variable potentiometer is coupled to set to the DC bias applied to the output, driver transistor and in particular the DC bias as applied to its base.

In a typical TV receiver, the output, driver transistor is AC/DC coupled with either the control grid or cathode of the CRT so that adjusting of the DC bias applied to the output transistor in turn adjusts the black level of the video signal, which approximates the back porch level of the video signal. Thus, where the amplitude A is decreased from a situation of high contrast to a situation of low contrast, the DC bias remains relatively constant so that a corresponding change in the white peak level and the black level, also will occur. As a result, when the contrast is readjusted as desired, the black level is, in a sense, lowered so that the displayed black portions of the image now appear as gray. To correct this condition in a normal TV receiver, the brightness control is adjusted to reset the black level to a relatively constant level so that the black portions will appear as black. Thus, in order to maintain the quality of the displayed image in terms of maintaining the blackness of the dark portions of the image, it is necessary to adjust two distinct controls.

In U.S. Pat. No. 3,804,981 of Avins, there is disclosed a luminance signal amplifier including separate contrast and brightness controls. In particular, it is disclosed that the contrast control in the form of a potentiometer sets the gain of an amplifier in the form of a driver transistor, which variably amplifies the video input signal as fed through its base, and the separate brightness control sets the DC bias level of the output, i.e. the collector, of the driver transistor. Further, the contrast and brightness controls, each in the form of potentiometers, are intercoupled by a coupling resistive element so that the black level or brightness can be held constant or made to vary in a manner as determined by the setting of the contrast control. The above-noted patent indicates that the direct voltage level at the output of the driver transistor does change if the contrast control is varied and seeks to compensate for such change by the insertion of the coupling resistor. However, the readjustment of the black level is made dependent upon the setting of the contrast control so that, in effect, the black level is not set with respect to a relatively constant level, but rather to the setting of the contrast control itself. Thus, it is contemplated that for certain settings of the contrast control, the DC level of the output of the driver transistor would result in the display of an image, wherein the black tones are gray values, e.g. for relatively low settings of contrast.

SUMMARY OF THE INVENTION

It is therefore an object of this invention to provide a new and improved television receiver wherein the brightness and contrast characters of the displayed image are set accurately with but a single control of the television receiver.

It is a more particular object of this invention to provide a new and improved television receiver wherein the black level of the video signal applied to the receiver's CRT is variably set as a function of the setting of its contrast control, whereby the black level is maintained at a relatively constant level despite variations in contrast settings.

In accordance with these and other objects of the invention, there is disclosed a video amplifier circuit for a television receiver, including a single combined contrast/brightness control, whereby the contrast of a displayed image upon the receiver's CRT is set, and circuit means for variably adjusting the black level of the displayed image at a substantially fixed level. In an illustrative embodiment of this invention, the fixed black level is set at a point substantially equal to the electron beam cutoff point of the receiver's CRT. In this manner, the displayed black portions of the image upon the CRT are displayed at a relatively maximum black intensity.

In a preferred embodiment of this invention, the combined contrast/brightness control is coupled to the input of a driver, amplifier device in the form of a transistor by an AC/DC coupling in the form of a resistor and capacitor connected inparallel with each other between the contrast control and the aforementioned driver transistor. In turn, the output of the driver transistor is coupled to the cathode of the TV receiver's CRT by means of a partial AC coupling. A switch means coupled to the point of interconnection between the parallel-connected resistor and capacitor, and the input of the driver transistor, serves to dispose the input of the driver transistor in a charging circuit during the horizontal blanking interval, whereby the capacitor is charged to a potential dependent upon the voltage appearing at the variable tap of the contrast/brightness control, which in turn is a function of the desired contrast setting and the sync tip and back porch voltages of that video information as contained within the video signal during the horizontal blanking period. Thus, the capacitor applies the full AC video signal to the input of the driver transistor from the variable tap of the contrast/brightness control, and, the parallel combination of the capacitor and resistor applies a variable voltage to the input of the driver transistor, thereby tending to bias the output transistor so that the amplified video signal and in particular the black portions thereof, are of a voltage level corresponding substantially to the electron beam cutoff point of the receiver's CRT.

BRIEF DESCRIPTION OF THE DRAWINGS

These and other objects and advantages of the present invention will become more apparent by referring to the following detailed description and accompanying drawings, in which.

DETAILED DESCRIPTION OF THE PREFERRED EMBODIMENT

Figure 1:
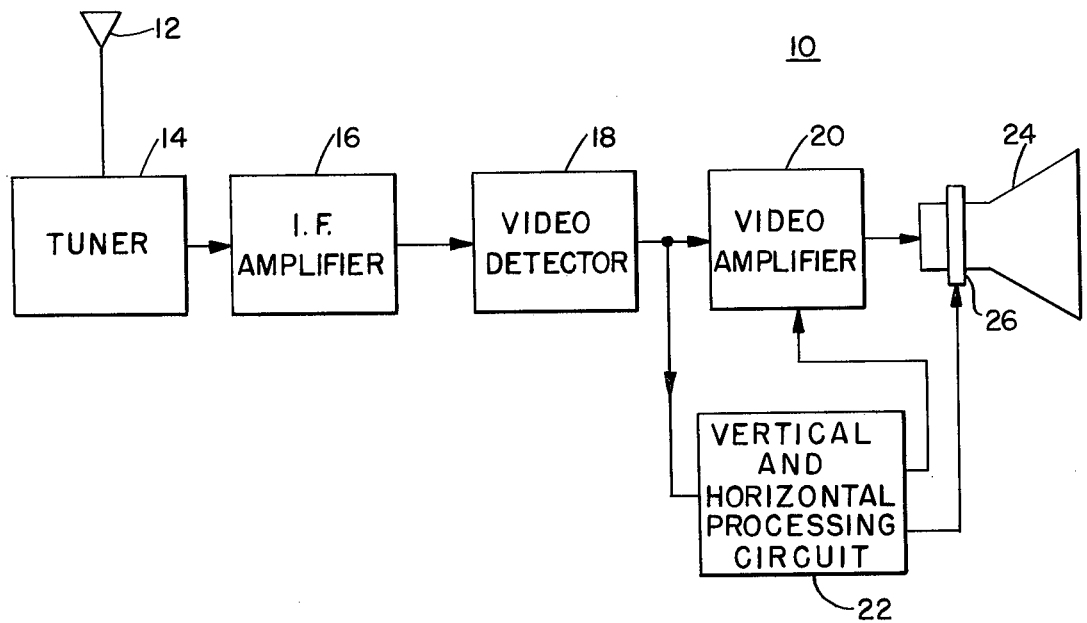
FIG. 1 is a schematic showing in block form of a television receiver, illustrating the incorporation therein of the video amplifier and the combined contrast/brightness picture control in accordance with the teachings of this invention.

Referring now to the drawings and in particular to FIG. 1, there is shown a television receiver 10, into which a video amplifier 20, having but a single combined contrast/brightness control in accordance with the teachings of this invention, has been incorporated. The television receiver 10 is illustrated as a black-and-white receiver, but it is noted that this invention has equal application to a color television receiver. The television receiver 10 includes an antenna 12 coupled to a tuner 14 having the usual RF, IF, oscillator and mixer stages. In turn, the tuner output is applied to an IF amplifier 16, the output of which, in turn, is applied to a video detector 18 which develops, as is well-known in the art, a video signal to be amplified by the video amplifier 20 and a sync signal indicative of the horizontal and vertical scanning information, to be applied to a vertical and horizontal processing circuit 22 which develops corresponding vertical and horizontal blanking signals to be applied to each of the video amplifier 20 and to a set 26 of vertical and horizontal scanning coils. Though shown by but a single output line, the input to the video amplifier 20 includes both vertical and horizontal blanking pulses and the input to the coils 26 includes horizontal and vertical scanning signals. The amplified video signal as derived from the video amplifier 20 is applied typically to a cathode of a cathode ray tube (CRT) 24.

Figure 2:
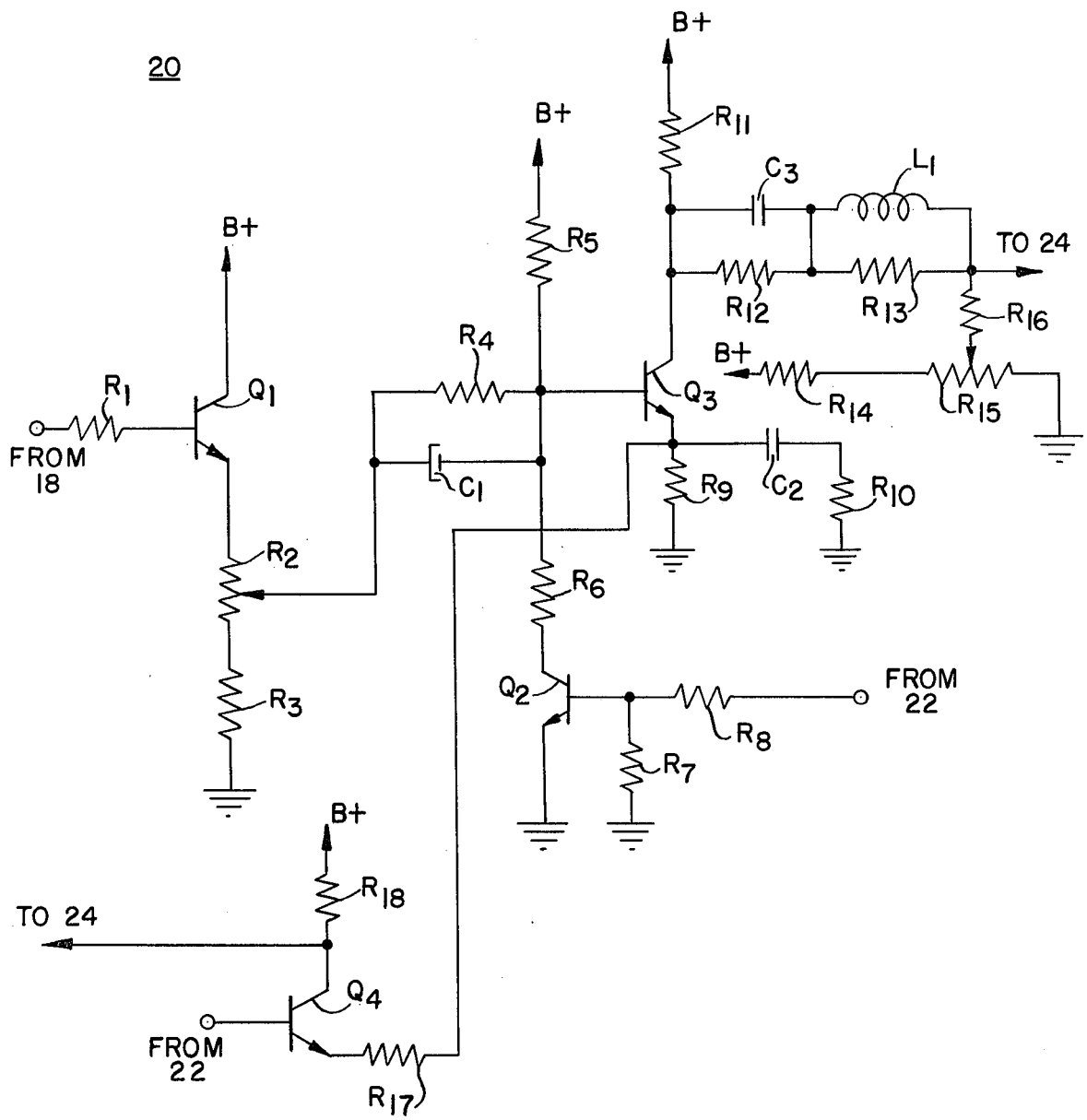
FIG. 2 is a detailed schematic circuit of the video amplifier in accordance with teachings of this invention.

Referring now to FIG. 2, there is shown a detailed circuit diagram of the elements comprising the video amplifier 20. In particular, the video signal as derived from the video detector 18 is applied via resistor R1 to the base of transistor Q1, the collector of which is applied to a suitable bias voltage B+ and the emitter of which is connected through a series-connected potentiometer R2 and resistor R3 to ground. The potentiometer R2 forms the single contrast/brightness control of this invention. The variable tap of potentiometer R2 is coupled to the base of a driver, output transistor Q3 via an AC/DC coupling circuit comprised of parallel-connected resistor R4 and capacitor C1. As will be explained in some detail later, the resistor R4 and capacitor C1, in combination with resistors R5 and R6, serve to bias the input or base of the driver transistor Q3 to a variable potential such that the video signal as amplified by transistor Q3 has black portions disposed at a potential level corresponding to the electron beam cutoff point of CRT 24. As shown in FIG. 2, the point of interconnection between the resistor R4 and capacitor C1, and the base of the driver transistor Q3, is further biased by a resistor R5 connected therefrom to a bias potential B+, and the resistor R6 coupled from the point of interconnection in-series with a clamping transistor Q2 to ground. Horizontal blanking pulses, as derived from the vertical and horizontal processing circuit 22, are applied via resistor R8 to the base of transistor Q2, whereby transistor Q2 is turned on for the horizontal blanking period to form a charging circuit, as will be explained later in detail. Further, the base of transistor Q2 is connected to ground by a further biasing resistor R7.

The output of the driver transistor Q3 as derived from its collector, is applied via an AC/DC coupling circuit to the cathode of CRT 24. The coupling circuit is comprised of a resistor R12 of a relatively high value in-series with resistor R13 of a relatively smaller value. The remote terminal of resistor R13 is coupled via resistor R16 to the variable tap of a potentiometer R15 and to the cathode of CRT 24. Further, a capacitor C3 is connected in-parallel with the resistor R12 and is of a relatively high value to provide a partial AC coupling to the cathode of CRT 24. An inductance L1 is connected in-parallel with resistor R13 and forms in circuit with the aforementioned elements C3, R12 and R13, a filter whereby those video signals of a higher frequency are peaked or boosted from the video signal that is applied to the cathode of the CRT 24. In an illustrative embodiment of this invention, the impedance of the resistor R16 essentially equals that of the resistor R12, whereby an essentially 50% DC coupling is achieved between the collector or output of transistor Q3 and the cathode of CRT 24. The remote end of resistor R16 is connected to the variable tap of the potentiometer R15 interconnected between ground and a biasing source B+ through a series-connected resistor R14. The potentiometer R15 is preferably adjusted during the manufacture and assembly of the TV receiver in order to compensate for variations in the cutoff voltages and/or other characteristics of the CRT incorporated into a particular TV receiver. The potentiometer R15 is disposed as to be unavailable to the receiver viewer and is normally only adjusted during the assembly of the receiver 10. The collector of Q3 is connected through a resistor R11 to a biasing voltage B+, and its emitter is connected through a biasing resistor R9 to ground and also through a capacitor C2 and series-coupled resistor R10 to ground. The capacitor C2 and resistor R10 serve as video peaking to improve picture quality.

Further, vertical blanking pulses are applied to the base of a transistor Q4, whose emitter is coupled via resistor R17 to the emitter of the output transistor Q3. The collector of transistor Q4 is coupled to biasing voltage B+ by resistor R18 and also to the G1 or control grid of the CRT 24. The vertical blanking pulses turn transistor Q4 on, whereby a potential applied to the emitter of transistor Q3 is raised, thereby serving to further turn off transistor Q3 and thereby raise the voltage applied to the cathode of CRT 24. In addition, the collector of transistor Q4 is coupled to the control or G1 electrode of the CRT 24, whereby when transistor Q4 is turned on in response to the vertical blanking pulses, the potential applied to the control grid of the CRT 24 is lowered. Thus, there is seen a dual action during the vertical blanking period in which the potential applied to the cathode and to the control grid are raised and lowered, respectively, thereby serving to further turn off the CRT beam and render darker the image displayed thereby during the vertical retrace period.

In order to apply the amplified video signal as appearing at the collector of transistor Q3 to the cathode of the CRT 24, it is necessary to effectively partial AC couple the video signal instead of full DC coupling therebetween, illustratively by inserting therebetween a relatively large capacitor C3, since the partial AC coupling improves the reproduceability of brighter scenes on the CRT 24. As now will be explained with respect to FIG. 3, the partial AC coupling introduces the problem that if the amplitude of the video signal is adjusted by changing the potentiometer R2, the black level of the video signal is lowered, with the result that the black portions of the displayed image now are rendered in gray as opposed to black tones. To illustrate this problem, the peak white level at the cathode of the CRT 24 is illustratively assumed to be of a value of 40V, the black level is assumed to be 90V, and the sync tip is approximately assumed to be disposed at a potential of 110V. Thus, the video signal varies with a peak-to-peak amplitude A in the order of 50V, at a maximum setting of the contrast control R2. In FIG. 2, the variable tap of the resistor R2 at that maximum setting would be disposed to its uppermost position, whereby the amplitude A of the video signal would be increased correspondingly to its maximum. It is assumed for this illustration that a black level of a potential of 90V, as applied to the cathode of the CRT 24, will substantially cut off the emission of its electron beam, thereby rendering those portions of the image an intense black. Now assume that the contrast/brightness control potentiometer R2 is adjusted from its maximum setting to a setting whereat the amplitude A of the video signal as derived from the emitter Q1 is decreased to a value of 50%; for example, the variable tap of the potentiometer R2 is, approximately, set at its midpoint, assuming the resistivity of the potentiometer to be linear. Thus, the peak-to-peak amplitude A of the video signal appearing at the collector of transistor Q3 would be decreased from a value of 50V to a value of 25V.

If it is assumed that the resistor R4 is eliminated for explanation purposes, then the black level of the video signal applied to the base of transistor Q3 is restored at a substantially constant level regardless of the contrast/brightness control settings by the clamping function of transistor Q2. This will maintain the black level substantially constant at the collector of transistor Q3; however, due to the AC coupling function of capacitor C3, the peak black level of the reduced amplitude video signal would be in the order of 77.5V DC, and the peak white level would be in the order of 52.5V DC. As a result, the white level is reduced substantially to the desired level and the black level is reduced to approximately 12.5 volts less than the normal cut-off potential, e.g. 90V DC, of CRT 24. Now those portions of the signal corresponding to black are not so portrayed as true black, but rather are portrayed in gray tone, in that the electron beam is not cut off, but rather a substantial electron density still impinges upon the display screen of the CRT 24.

In accordance with the teachings of this invention, the voltage appearing at the collector of the driver transistor Q3 is adjusted in a manner to maintain the black level of the amplified video signal at a level corresponding to the cutoff point of the CRT 24, regardless of the contrast/brightness control settings. As will be explained now in detail, this is essentially effected through the use of the resistors R4, R5 and R6 and capacitor C1, combined with the clamping function of Q2 and the DC bias of resistor R2. As explained above, when the contrast/brightness control or variable resistor R2 is set to its mid-point to reduce the white level to a desired level, the black level of the reduced amplitude video signal is lowered by an amount of about 12.5 volts at the cathode of CRT 24. To compensate for the reduced black level, the collector of transistor Q3 should be raised substantially. In order to raise the collector of the driver transistor Q3, the biasing level applied to the base of transistor Q3 should be lowered or made more negative by an amount to increase the black level or positive peak of the video signal to a relatively fixed value corresponding to the cutoff point of the CRT 24. The magnitude of the increase is dependent substantially upon the ratio of resistors R12 and R16 which determines the amount of the DC coupling and upon the gain of the transistor Q3 which in turn is dependent upon the value of the resistors R11 and R9. In the illustrative example given above where the DC coupling provided by the resistors R12 and R16 is approximately 50%, it would be necessary to increase the voltage appearing at the collector of the driver transistor Q3 by approximately 25 V and further assuming that the resistors R11 and R9 are set to provide the transistor Q3 with a gain of approximately 100, it would be necessary to decrease the bias potential applied to the base of the driver transistor Q3 by approximately 0.25V. To this end, the resistor R4 provides, as previously described, a DC coupling between the variable tap of the potentiometer R2 and the base of transistor Q3. Thus, the resistor R4 in combination with the resistance of resistors R6 and R5, and the emitter-to-collector impedance of transistor Q2, are set to act as a voltage divider, whereby the DC signal applied at the variable tap of potentiometer R2 is divided, to reduce, or render more negative, the bias potential applied to the base of the driver transistor Q3 by an amount of approximately 0.25V. As mentioned above, the value of the resistor R5 also effects the bias potential applied to the base of the driver transistor Q3 and is selected to be of such a resistivity to set the bias of transistor Q3 whereby at a minimum video amplitude or contrast of the displayed signal, a minimum level of brightness is achieved.

As now will be explained, the action of the capacitor C1 maintains the black level of the amplified video signal as derived from the collector of the driver transistor Q3, at a relatively constant level corresponding to the cutoff point of the CRT 24. To this end, the capacitor C1 acts as a storage means and provides an AC coupling between the variable tap of the potentiometer R2 and the input or base of the driver transistor Q3. The capacitor C1 serves as a storage means in the sense that a DC potential is stored thereon that varies as a function of the setting of the potentiometer R2; however, the peak-to-peak amplitude "A" of the video signal at the variable tap of resistor R2 is fully transfered to the base of transistor Q3 regardless of the potential stored on capacitor C1.

Figure 3:
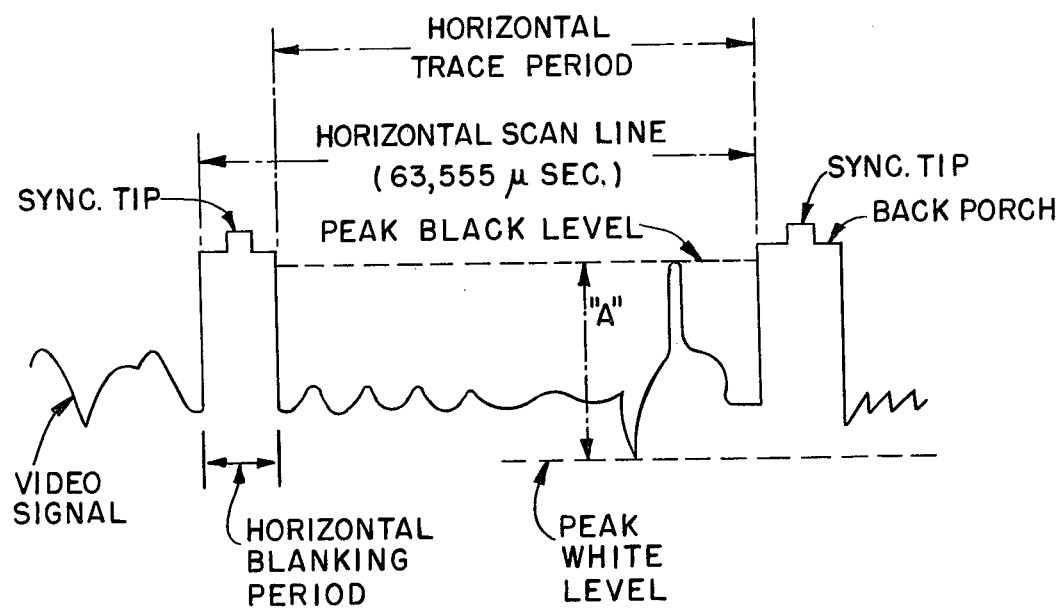
FIG. 3 is an illustration of a video signal as amplified by the video amplifier of this invention.

The variable charge is stored upon capacitor C1 in the following fashion. During the horizontal retrace period, the horizontal blanking pulse as derived from the vertical and horizontal processing circuit 22 is applied to the base of the clamping transistor Q2, which thereby is rendered conductive, connecting the capacitor C1 in a charging circuit traced from the variable tap of the potentiometer R2 through the capacitor C1 and resistor R4 and through resistor R6 to ground. The impedances of resistors R4 and R6 are selected to control the charging level of the capacitor C1. During the horizontal retrace period, the capacitor C1 is charged to a potential dependent upon the voltage appearing at the variable tap R2, which, as seen in FIG. 3, corresponds substantially to the average voltage level of the sync tip and back porch level of the viedo signal as applied across the potentiometer R2 during the horizontal retrace period. Of course, the charged voltage level is a function of and is dependent upon the setting of the resistor R2. Thus, if the contrast/brightness control in the form of the potentiometer R2 is set for a lower value of contrast, the voltage level of the sync tip is correspondingly varied and the average charge established upon capacitor C1 is thus varied. During the remaining portion of the horizontal scan, as seen in FIG. 3, the clamping action of capacitor C1 tends to hold the black level of the video signal relatively constant as applied to the base of the driver transistor Q3, thereby maintaining the black level or maximum positive peak amplitude of the video signal appearing at the collector of transistor Q3 at a relatively constant level.

Numerous changes may be made in the above-described apparatus and the different embodiments of the invention may be made without departing from the spirit thereof; therefore it is intended that all matter contained in the foregoing description and in the accompanying drawings shall be interpreted as illustrative and not in a limiting sense.

What is claimed is:

1. In a television receiver having a cathode ray tube (CRT) for displaying images, an image-representative video signal amplifier comprising:
   (a) a source of an image representative video signal, the image-representative video signal including periodic flyback pulses;
   (b) a driver amplifier means for providing an amplified video signal to its output electrode, which in turn is coupled to the CRT, said driver amplifier means having an input electrode;
   (c) combined contrast/brightness control means coupled to receive the image-representative video signal from said source and settable to at least first and second settings for setting the image-representative video signal to a first, relatively large amplitude and a second, relatively small amplitude, respectively; and
   (d) compensation means disposed in-circuit between said combined contrast/brightness control means and said driver amplifier means for applying the varied video signal from said combined contrast/brightness control means to said input of said driver amplifier means and including means for varying the voltage level at said input of said driver amplifier means dependent upon the setting of said combined contrast/brightness control means, whereby for the first setting of said combined contrast/brightness control means, the dark portion of the CRT image is at a black level and for the second setting of said combined contrast/brightness control means, the dark portion of the CRT image is at a gray level.

2. The video signal amplifier as claimed in claim 1, wherein there is further included means for DC and AC coupling said output electrode of said driver amplifier means to the CRT.

3. The video signal amplifier as claimed in claim 1, wherein said compensation means comprises a charging circuit for variably charging a storage element to a potential dependent upon the setting of said combined contrast/brightness control means.

4. The video signal amplifier as claimed in claim 3, wherein said charging circuit charges said storage element to a potential dependent upon the voltage level of the flyback pulse of the video signal.

5. The video signal amplifier as claimed in claim 4, wherein said compensation means includes switch means for selectively completing said charging circuit to charge said storage element for an interval corresponding to the horizontal blanking period, whereby said storage element is charged to a potential that corresponds to the sync tip of the video signal.

6. The video signal amplifier as claimed in claim 4, wherein said compensation means includes a biasing circuit for biasing said input electrode of said driver amplifier means to a potential tending to compensate for variations in the amplitude of the video signal as effected by said combined contrast/brightness control means.

7. The video signal amplifier as claimed in claim 6, wherein said biasing circuit includes a first resistor connected in parallel circuit with said storage element, and a second resistive element, whose point of interconnection to said storage element is connected to said input electrode of said driver amplifier means and whose respective impedances are selected to provide the desired compensation.

8. The video signal amplifier as claimed in claim 7, wherein said biasing circuit further includes a third resistor coupled from a potential source to said point of interconnection and having a resistance determined to set the level of brightness of the video signal at a minimum contrast setting as determined by said combined contrast/brightness control means.

9. The video signal amplifier as claimed in claim 7, wherein said first resistor has a resistivity selected to set the rate of charging of said storage element.

10. The video signal amplifier as claimed in claim 1, wherein said combined contrast/brightness control means comprises a potentiometer, and said source includes a second amplifier means having an input electrode for receiving the image-representative video signal and an output electrode for applying same to said potentiometer, the variable tap of said potentiometer being coupled to said compensation means.

11. In a television receiver having a cathode ray tube (CRT), an image-representative signal amplifier comprising:
   (a) a source of an image-representative video signal;
   (b) a variable contrast/brightness control impedance coupled to said source for receiving the image-representative video signal and for varying the amplitude of the image-representative video signal;
   (c) a driver transistor having a base electrode and output collector electrode coupled to the CRT;
   (d) compensation means disposed in-circuit between said contrast/brightness control impedance and said base of said driver transistor and comprising a resistor and a capacitor connected in parallel, said resistor DC coupling the varied image-representative video signal as derived from said variable contrast/brightness control impedance to said base of said amplifier and said capacitor storing a voltage dependent upon the signal level during the blanking interval of the image-representative video signal and the setting of said combined contrast/brightness control impedance, whereby the voltage level at said base electrode of said driver transistor is varied as a function of the setting of said impedance.

* * * * *